United States Patent
Chen et al.

(10) Patent No.: US 9,348,580 B2
(45) Date of Patent: May 24, 2016

(54) PROCESSING STREAMING DATA WITH OPEN EXECUTORS

(71) Applicant: Hewlett Packard Enterprise Development LP, Houston, TX (US)

(72) Inventors: Qiming Chen, Cupertino, CA (US); Meichun Hsu, Los Altos Hills, CA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 0 days.

(21) Appl. No.: 14/416,610

(22) PCT Filed: Oct. 26, 2012

(86) PCT No.: PCT/US2012/062275
§ 371 (c)(1),
(2) Date: Jan. 22, 2015

(87) PCT Pub. No.: WO2014/065826
PCT Pub. Date: May 1, 2014

(65) Prior Publication Data
US 2015/0205601 A1    Jul. 23, 2015

(51) Int. Cl.
*G06F 9/44* (2006.01)
*G06F 9/445* (2006.01)
*G06F 9/45* (2006.01)
*G06F 9/30* (2006.01)
*G06F 9/54* (2006.01)

(52) U.S. Cl.
CPC .. *G06F 8/70* (2013.01); *G06F 8/41* (2013.01); *G06F 9/30* (2013.01); *G06F 9/44521* (2013.01); *G06F 9/54* (2013.01)

(58) Field of Classification Search
CPC ............................... G06F 8/41; G06F 9/44521

USPC .................................................. 717/140, 163
See application file for complete search history.

(56) References Cited

U.S. PATENT DOCUMENTS

| 8,261,234 | B1* | 9/2012 | Aarts .................... G06F 8/45 703/7 |
| 2006/0282543 | A1 | 12/2006 | Bowater et al. |
| 2008/0088633 | A1 | 4/2008 | Lin et al. |
| 2008/0109795 | A1* | 5/2008 | Buck .................... G06F 8/443 717/137 |
| 2010/0070355 | A1 | 3/2010 | Fernandez |
| 2010/0122264 | A1 | 5/2010 | Xiaocheng et al. |
| 2012/0066668 | A1 | 3/2012 | Buck et al. |

(Continued)

FOREIGN PATENT DOCUMENTS

WO    WO-2011162628 A2    12/2011

OTHER PUBLICATIONS

International Search Report and Written Opinion of the International Searching Authority, mailed Apr. 12, 2013, issued in related PCT Application No. PCT/US2012/062275.
Lee, S et al, "GPU Kernels as Data-Parallel Array Computations in Haskell", Mar. 16, 2009.
Rossbach, C.J. et al, "PTask: Operating System Abstractions to Manage GPUs as Compute Devices", Sep. 21, 2011.

(Continued)

*Primary Examiner* — Phillip H Nguyen
(74) *Attorney, Agent, or Firm* — Fabian VanCott (57) ABSTRACT

Processing streaming data with open executors includes receiving input data at a computation dataflow station where the computation dataflow station contains a computation file and an open executor that accepts code plug-ins, converting contents of the computation file into a program string with the code plug-ins from a system library, and launching the program string together with the input data to calculate an output with a graphics processing unit.

15 Claims, 5 Drawing Sheets

(56) References Cited

U.S. PATENT DOCUMENTS

| | | |
|---|---|---|
| 2012/0066696 A1 | 3/2012 | Dasgupta et al. |
| 2013/0047074 A1* | 2/2013 | Vestergaard ............... G06F 3/14 715/234 |
| 2013/0159981 A1* | 6/2013 | Klemenz ................. G06F 8/427 717/143 |

OTHER PUBLICATIONS

Bourgoin, M. et al.; "SPOC GPGPU Programming Through Stream Processing with OCAML"; May 19, 2012; http://hal.upmc.fr/docs/00/69/74/10/PDF/S0129626412400075.pdf; vol. 22; Issue2.

* cited by examiner

PROCESSING STREAMING DATA WITH OPEN EXECUTORS

CROSS-REFERENCE TO RELATED APPLICATION

Pursuant to 35 U.C.S. §371, this application is a United States National Stage Application of International Patent Application No. PCT/US2012/062275, filed on Oct. 26, 2012, the contents of which ar incorporated by reference as if set in their entirety herein.

BACKGROUND

A dataflow is the computer architecture that controls the processing of data. The data may come from a database or be recorded with sensors in real time as the data is processed. Dataflow operators perform tasks with the data as the data passes through each dataflow station. For example, tasks may include grouping data, compressing data, decoding data, or other tasks.

Streamed data is a sequence of data elements where the data elements are sequentially made available over time. When data is streamed in real time through a dataflow, the dataflow processes the data elements such that the processed data elements are also made available to users in real time. For example, the processed streamed data may be displayed in a monitor where users can observe the processed information over time.

BRIEF DESCRIPTION OF THE DRAWINGS

The accompanying drawings illustrate various examples of the principles described herein and are a part of the specification. The illustrated examples are merely examples and do not limit the scope of the claims.

DETAILED DESCRIPTION

Any point along the dataflow may become a bottleneck that impedes real time processing of the streaming data. Bottlenecking can occur where a processing task takes longer than desired to keep up with the real time processing pace. Central processing units (CPUs) generally execute one task at a time, and thus, any delay with a CPU delays the processing of all downstream data. To overcome the potential delays that are inherently possible when relying on a CPU to process data, the principles described herein describe a graphics processing unit (GPU) to be used in conjunction with the CPU. The GPU has an ability to process multiple sequences of data simultaneously. Thus, the combination of the CPU and the GPU reduce the risk of creating processing delays.

However, tasks that are executed with a GPU are programmed in different ways than the programming language for the tasks performed with the CPU. For example, the program instructions for a CPU are written in format that executes tasks serially, while the program instructions for the GPU are written in a manner that takes advantage of the GPU's parallel processing abilities. As a result, programming the dataflow stations to execute complex processes involves a complicated code.

The principles described herein reduce programming complexity for the programmer when programming processing tasks for streaming data to be processed with a GPU by providing systemic processing platforms that simplify the programming's complexity. Such a method may include receiving input data at a computation dataflow station where the computation dataflow station contains a computation file and an open executor that accepts code plug-ins, converting contents of the computation file to a program string with the plug-ins from a system library, and launching the program string together with the input data to calculate an output with a graphics processing unit.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described is included in at least that one example, but not necessarily in other examples.

Figure 1:
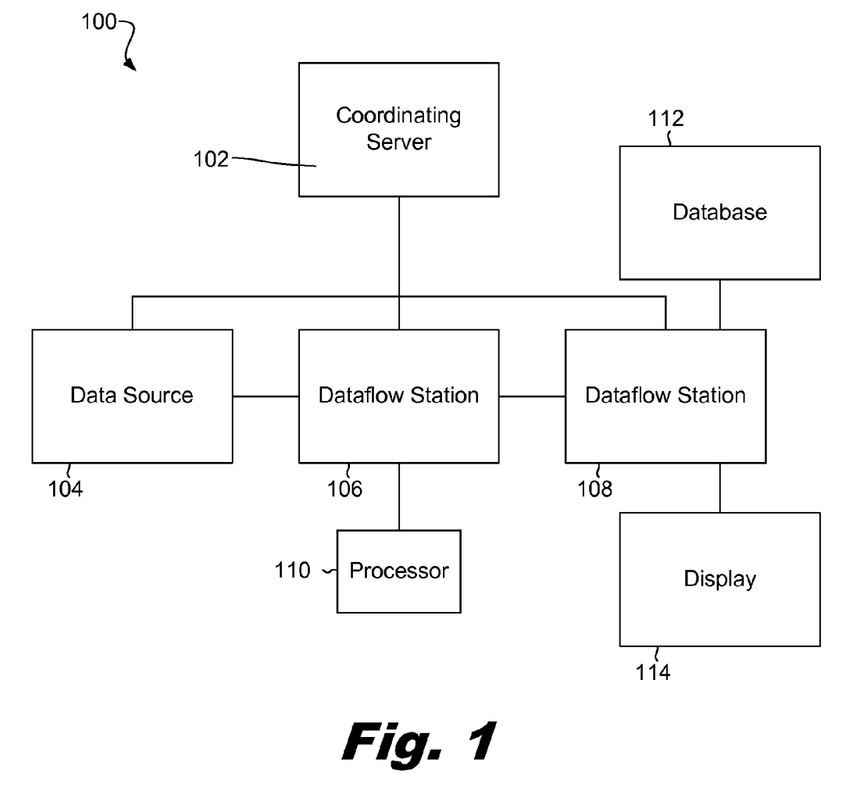
FIG. 1 is a diagram of an example of a dataflow system according to principles described herein.

FIG. 1 is a diagram of an example of a dataflow system (100) according to principles described herein. In this example, the dataflow system (100) has a coordinating server (102) that is in communication with a data source (104), a first dataflow station (106), and a second dataflow station (108). The coordinating server (102) coordinates the activities of the first and second dataflow stations (106, 108). The data source (104) may be a storage unit, such as a database of raw data. In other examples, the data source (104) is at least one sensor that is taking real time measurements and feeding those measurements into the dataflow system (100). Further, the data source (104) can be a sensor array that is taking multiple measurements about a target system. In some examples, the sensor array takes a single type of measurement, and in alternative examples, the sensor array takes multiple types of measurements.

While the example of FIG. 1 is described with specific reference to a dataflow system (100) with just two dataflow stations, any number of dataflow stations may be used in accordance with the principles described herein. Each of the dataflow systems have dataflow operators that cause tasks to be performed on the data. For example, the first dataflow station may have an open executor that causes the types of measurements to be sorted by a particular characteristic, while a second dataflow station has another executor that causes certain aspects of the measurements to be calculated.

The input data is streamed data, which is a sequence of tuples. The tuples are lists of objects. As the streamed input data is operated upon with the open executors in the dataflow station, the streamed input data is transformed into a streamed output of data. The dataflow station's open executors may process the input data by performing calculations on the input data.

The open executor has a characteristic that allows plug-in codes to be added to the open executor's existing code contained in computation files stored in the dataflow station. The plug-ins may be located in local or remote libraries, and the plug-ins may be added to the contents of the computation files to create program strings that are tailored to perform the executor's tasks. The plug-ins in the libraries may be user defined programs or system provided programs. The open executors are provided by the system and, thus, to finalize the program string, the plug-ins, which are either system provided or user generated, are merely plugged into the computation file's content. As a result, the programming of the dataflow station is reduced.

Here, the first dataflow station has an open executor that causes a processor (110) to calculate aspects of the input data. The type of calculation process to be performed on the input data may determine, in part, which types of input data are received at the first dataflow station (106). The input data may be made of tuples (lists of data) describing position vectors, such as an x-coordinate and a y-coordinate in a two dimensional place. For example, the tuples may be a list of positional coordinates such as (x, y), where x and y are coordinates in a two dimensional plane. Tuples describing position vectors may be summed, subtracted, multiplied, or otherwise processed during a calculation process. In other examples, the input data contains tuples that describe matrix elements. The matrix elements may be formatted as [a, b, c], where a, b, and c are matrix elements. The calculation process may sum, subtract, multiple, average, or otherwise process the matrix elements during a calculation process. Other formats of the input data may also determine that other types of calculation processes are to be used. Further, the predetermined use of the data may also determine how the data is processed.

The first dataflow station (106) is in communication with a processor (110) that is programmed to cause the calculation to occur at the first dataflow station (106). The instructions for how to perform the tasks may be written in a format that is easy for a programmer to write, such as Java code. Libraries are accessible to the processor (110) to retrieve runtime programs, user defined programs, computing resources, programming language translators, preprocessors, compilers, other processing resources, or combinations thereof to provide the first dataflow station (106) resources to create the appropriate program string and to perform the calculation process.

The second dataflow station (108) may be used to perform another calculation process on the data. In some examples, the second dataflow station (108) performs a non-calculating task with the output of the calculation process performed in the first dataflow station (106).

The second dataflow station (106) has the functionality of sending the processed data to a database (112) and/or to a display (114). The processed data may be sent to the database (112) to be used at a later time. To make the processed data viewable to users in real time, the processed data is sent to the display (114).

For example, if the data source (104) is collecting real time data about cars in multiple freeways to determine how much of a toll fee to charge, the data source (104) may be collecting information about each car. Every thirty seconds, an array of sensors may measure the position and direction of each car. Each measurement constitutes a measurement event that records multiple attributes about each car, such as each car's position, each car's direction, other attribute of each car, or combinations thereof. The different attributes are organized as tuples (list of data) describing position vectors or matrix elements that are sent to dataflow stations. For example, the different positions of the car over time may be represented as tuples formatted as position vectors and are added together to determine the speed of a particular car. In another example, each of the speeds for each car are grouped together as tuples formatted as matrices and the matrix elements are processed by averaging them together to determine the average speed of the cars in a particular freeway. The input data may be processed at the first dataflow station (106) and further processed at the second dataflow station (108). The coordinating server (102) causes the processed data be sent to a display (114) where a toll operator views the results of the calculations to determine how much to charge each car's driver. The coordinating server (102) also causes the processed information to be sent to the database (112) where the information is available for later analysis. The future analysis of the processed information can provide insight into how effectively the tolling system is working and give decision markers guidance for making future decisions.

Figure 2:
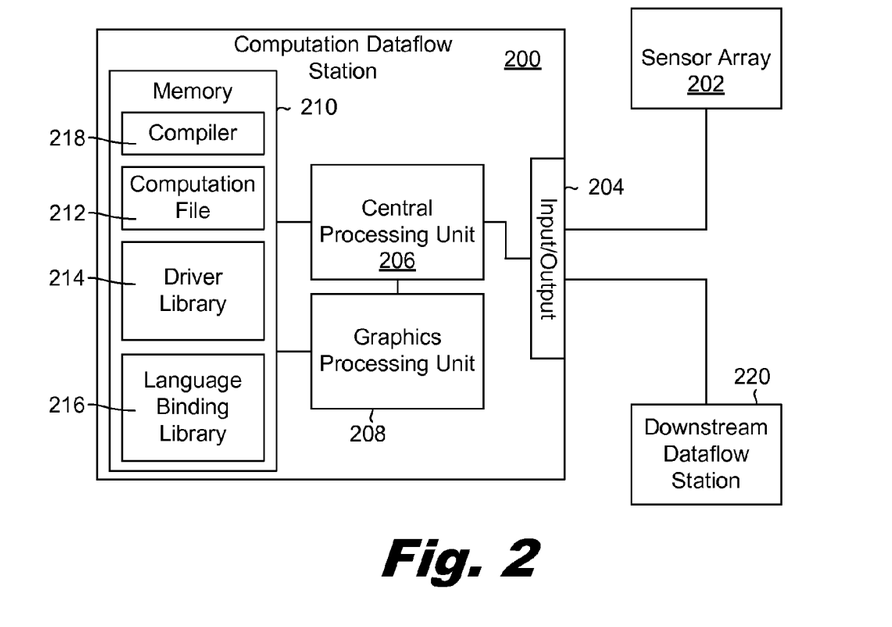
FIG. 2 is a diagram of an example of a dataflow processing station according to principles described herein.

FIG. 2 is a diagram of an example of a dataflow processing station (200) according to principles described herein. In this example, data comes to a computation dataflow station (200) from a sensor array (202) through an input/out (204). The input data may be formatted to contain tuples that describe position vectors. The dataflow processing station (200) has both a central processing unit (CPU) (206) and a graphics processing unit (GPU) (208). In some examples, the GPU (208) is a general purpose GPU that is used to perform general functions instead of exclusively performing tasks on graphics. The CPU (206) orchestrates the calculation processes or other tasks. Thus, the CPU (206) is in communication with the GPU (208) and they transfer data between themselves.

The CPU (206) is in communication with a memory (210) that contains data structures and program instructions. Aspects of the memory (210) will be described later. The data structures in the memory (210) include a computation file (212), a driver library (214), and a language binding library (216). The contents of the computation file (212) include programming instructions that can accept plug-ins to create a program string that causes the CPU (206) and the GPU (208) to perform a calculation process on the input data.

The driver library (214) contains plug-ins that are inserted into the programming instructions in the computation file (212). Here, the plug-ins are user defined programs or user defined kernels that are insertable into the computation file's programming instructions. However, in the example of FIG. 2, the computation file is written in a first programming language, like Java, while the user defined programs are written in a second programming language, like a C programming language. To interface between the first and second programming languages, the language binding library (216) provides sections of the first programming language associated with that section's equivalent in the second programming language. In this manner, a user may program the user defined programs in whatever programming language he desires and still has the ability to use the plug-ins provided in the driver library (214).

The completed program string is a set of program instructions that, when executed, cause the CPU (206) and GPU (208) to perform a calculation with the input data. The program string has portions that are intended to be carried out with the CPU (206) and other portions that are intended to be processed by the GPU (208). Further, the user defined programs are each written to account for these differences. Each of these portions is custom formatted to account for the differences between the CPU (206) and the GPU (208). The CPU (206) and the GPU (208) each have their own internal registers and memory caches to assist in executing their portions of the program string.

The user defined programs provided by the user may be written in higher level programming languages. A high level language is a programming language that is generally easier for a programmer to write. For example, Java is an objects oriented high level programming language in which a user may desire to write the user defined programs. While a low level language is more compatible with executing the instructions at the CPU (206) and/or the GPU (208). For example, the C programming language is a low level universal programming language that is executable in the CPU (206) and the GPU (208). The memory (210) includes a compiler (218), which represents program instructions that, when executed, causes the program string to be translated from a high level language to a low level language or vice versa. Thus, after the program string is launched, the compiler (218) translates the program string into a lower level language for execution on the CPU (206) and the GPU (208).

In response to creating a calculation output, the calculation output is sent to a downstream dataflow station (220). There, the calculation output may be further processed, displayed in a monitor, stored in a database, used in another manner, or combinations thereof.

Figure 3:
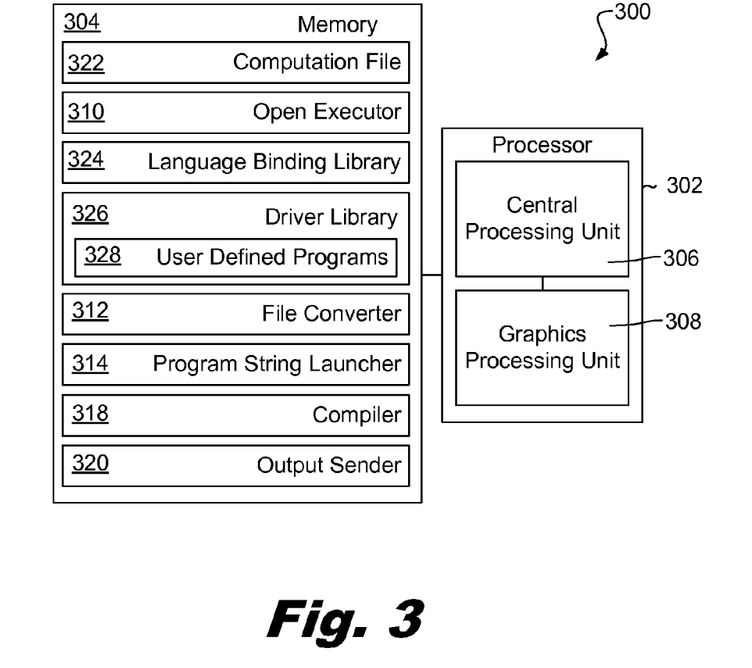
FIG. 3 is a diagram of an example of a processing system according to principles described herein.

FIG. 3 is a diagram of an example of a processing system (300) according to principles described herein. In this example, the processing system (300) includes a processor (302) that is in communication with memory (304). The processor (302) has both a central processing unit (CPU) (306) and a graphics processing unit (GPU) (308). The memory (304) represents generally any memory capable of storing data such as program instructions or data structures used by the processing system (300). The program instructions shown stored in memory (304) include an open executor (310), a file converter (312), a program string launcher (314), a compiler (318), and an output sender (320). The data structures shown stored in memory (304) include a computation file (322), a language binding library (324), and a driver library (326) that contains user defined programs (328), which are program instruction plug-ins provided by a user.

The memory (304) is a computer readable storage medium that contains computer readable program code to cause tasks to be executed by the processor (302). The computer readable storage medium may be tangible and/or non-transitory storage medium. A non-exhaustive list of computer readable storage medium types includes non-volatile memory, volatile memory, random access memory, memristor based memory, write only memory, flash memory, electrically erasable program read only memory, or types of memory, or combinations thereof.

The computation file (322) contains at least one programming instruction for executing tasks on the processor (302). The task may be exclusive for the CPU (306), exclusive for the GPU (308), or for both. The task may be programmed in a Java, a high level programming language.

The open executor (310) represents program instructions that, when executed, cause the processor (302) to execute the program instructions in the computation file (322). The open executor (310) is capable of accepting the plug-ins from the driver library (326) and, when executed, to cause the processor (302) to process the task. The driver library (326) is a data structure that contains user defined programs (328) that are provided by another source, such as a user. The user defined programs may be written in a C programming language, which is a desirable programming language for executing tasks in a GPU (308), or the user defined programs may be written in Java. When the programming language in the computation file is different than the programming language of the driver library (326), the language binding library (324) provides an interface between the different programming languages. The language binding library (324) is a data structure that contains sections of the first programming language and their equivalents in the second programming language.

The file converter (312) represents program instructions that, when executed, cause the processor (302) to convert the program instructions of the computation file into a program string by inserting the user defined programs (328) from the driver library (326). The program string launcher (314) represents program instructions that, when executed, cause the processor (302) to launch the program string to be executed. The compiler (318) represents program instructions that, when executed, cause the processor (302) to translate the high level programming language of the user defined programs and/or the program string into a lower level programming language for execution by the processor (302). In response to executing the lower level programming language, the GPU (308) is caused to make calculations with the input data. Initially, the calculated output is formatted in the lower level programming language, and the compiler (318) or other device translates the output into a programming language that is understood by the dataflow stations, such as Java.

The output sender (320) represents program instructions that, when executed, cause the processor (302) to send the calculated output to a downstream dataflow station. The downstream dataflow station may include another processing dataflow station, a database, a monitor, another device, or combinations thereof.

Further, the memory (304) may be part of an installation package. In response to installing the installation package, the programmed instructions of the memory (304) may be downloaded to the dataflow station from the installation package's source, such as an insertable medium, a server, a remote network location, another location, or combinations thereof. Insertable memory media that are compatible with the principles described herein include DVDs, CDs, flash memory, insertable disks, magnetic disks, other forms of insertable memory, or combinations thereof.

In some examples, the processor (302) and the memory (304) are located within the same physical component, such as a server, or a network component within the dataflow station. The memory may be part of the physical component's main memory, caches, registers, non-volatile memory, or elsewhere in the physical component's memory hierarchy. Alternatively, the memory (304) may be in communication with the processor (302) over a network. Further, the data structures, such as the libraries and may be accessed from a remote location over a network connection while the programmed instructions are located locally.

The processing system (300) of FIG. 3 may be part of a general purpose computer. However, in alternative examples, the processing system (300) is part of an application specific integrated circuit.

Figure 4:
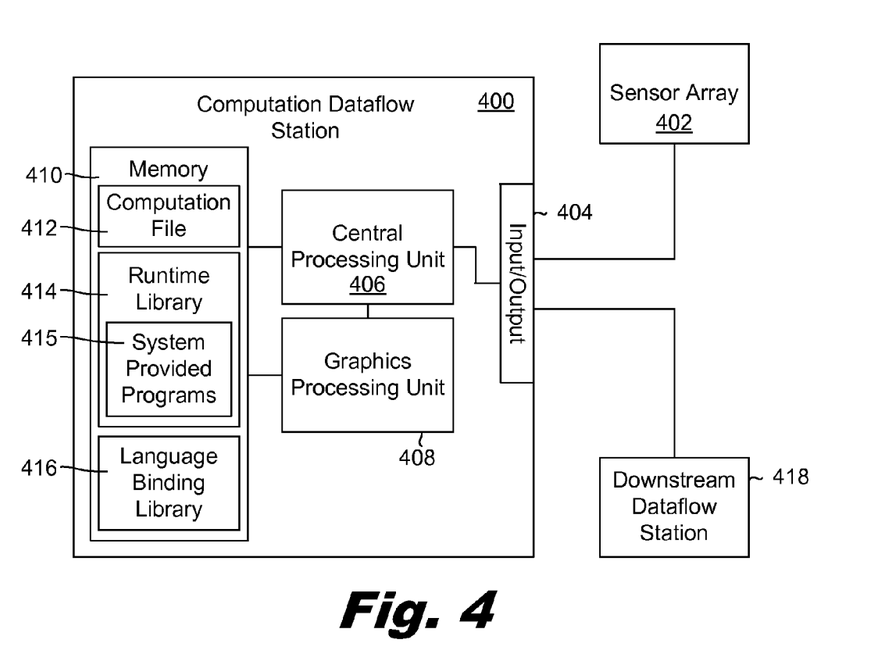
FIG. 4 is a diagram of an example of a dataflow processing station according to principles described herein.

FIG. 4 is a diagram of an example of a dataflow processing station (400) according to principles described herein. In this example, data comes to a computation dataflow station (400) from a sensor array (402) through an input/output (404). The input data may be formatted to contain matrices. The dataflow processing station (400) has both a central processing unit (CPU) (406) and a graphics processing unit (GPU) (408). The CPU (406) orchestrates the calculation processes or other tasks. Thus, the CPU (406) is in communication with the GPU (408) and they transfer data between themselves.

The CPU (406) is in communication with a memory (410) that contains data structures and program instructions. The data structures in the memory (410) include a computation file (412), a runtime library (414), and a language binding library (416). The contents of the computation file (412) include programming instructions that can accept plug-ins to create a program string that causes the CPU (406) and the GPU (408) to perform a calculation process on the input data.

The runtime library (414) contains plug-ins that are insertable into the programming instructions in the computation file (412). Here, the plug-ins are system provided programs (415) that are insertable into the computation file's programming instructions. Such system provided programs (415) may be in a different programming language than the programming language of the computation file (412). To interface between the different programming languages, the language binding library (416) provides translations from one code to the other. However, the system provided programs may be written in a lower level programming language that is compatible for causing the CPU (406) and the GPU (408) to execute the calculation without a compiler.

In response to creating a calculation output, the calculation output is sent to a downstream dataflow station (418). There, the calculation output may be further processed, displayed in a monitor, stored in a database, used in another manner, or combinations thereof.

Figure 5:
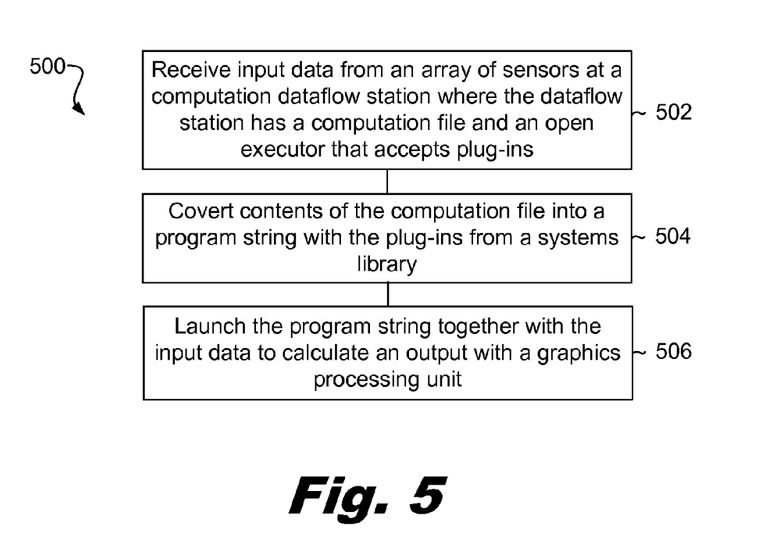
FIG. 5 is a diagram of an example of a method for processing streaming data according to principles described herein.

FIG. 5 is a diagram of an example of a method (500) for processing streaming data according to principles described herein. In this example, the method (500) includes receiving (502) input data from an array of sensors at a computation dataflow station where the dataflow station has a computation file and an open executor that accepts plug-ins, converting (504) contents of the computation file into a program string with the plug-ins from a systems library, and launching (506) the program string together with the input data to calculate an output with a graphics processing unit (GPU).

The input received at the computation dataflow station may be formatted in any number of ways. In some examples, the input data is formatted with tuples describing position vectors, matrices, other attributes, or combinations thereof.

The system library is a driver library where the plug-ins are user defined programs, or the system library is a runtime library where the plug-ins are system provided programs. In examples where the plug-ins are user defined plug-ins, a compiler is used to translate the user defined programs into a language compatible for execution with the GPU. The method may also include accessing a programming language binding library to interface between a first programming language of the computation file and a second programming language of the plug-ins in the system library. In examples where the compiler has translated the program string's language into a lower level language, the method includes writing the output into the original language in response to the GPU calculating the output. The calculated output is sent to a downstream dataflow station.

Figure 6:
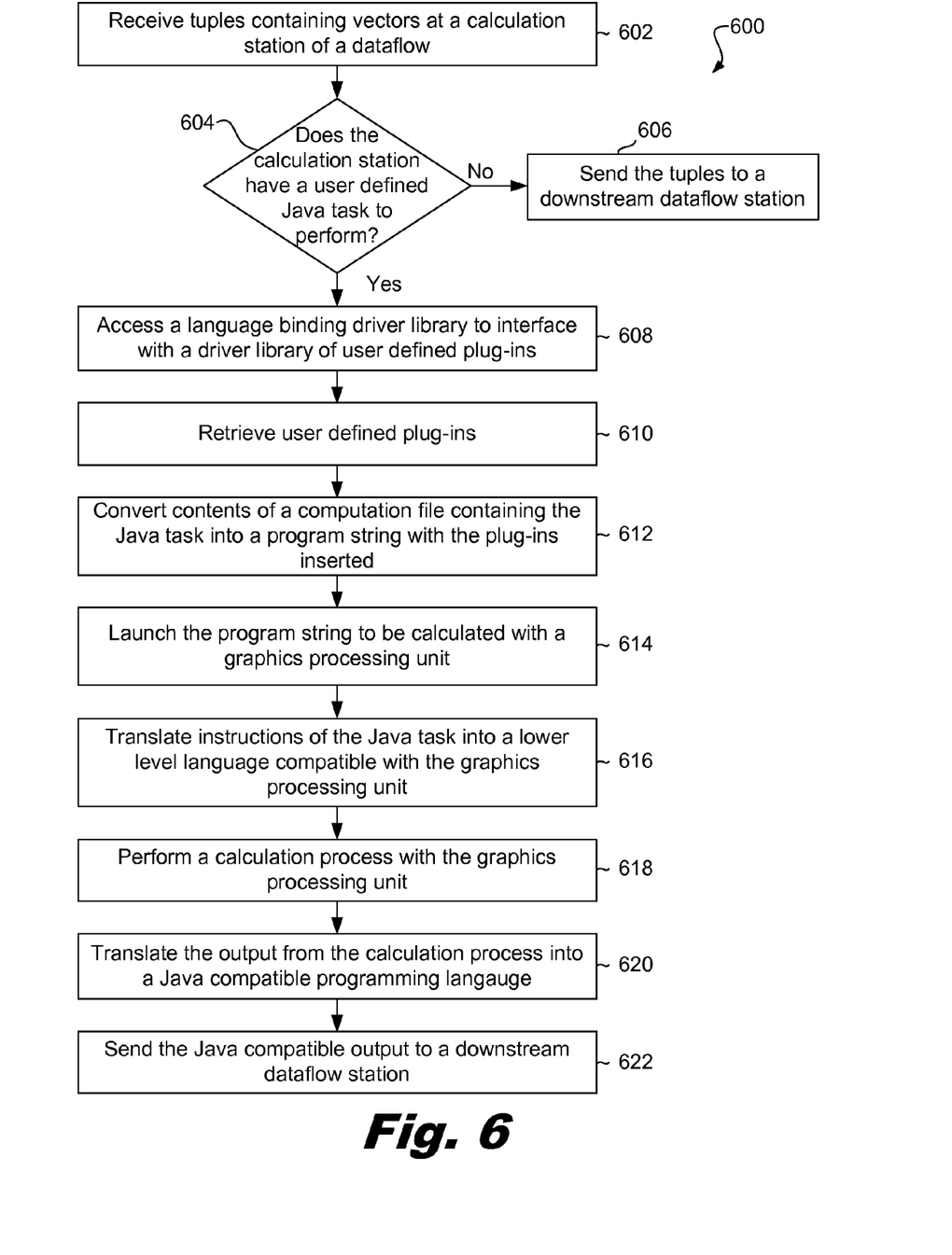
FIG. 6 is a diagram of an example of a flowchart of a process for processing streaming data according to principles described herein.

FIG. 6 is a diagram of an example of a flowchart (600) of a process for processing streaming data according to principles described herein. In this example, the process includes receiving (602) tuples containing vectors at a calculation station of a dataflow and determining (604) whether the calculation station has a Java task to perform. If not, the tuples are sent (606) to a downstream dataflow station.

However, if there is a Java task, the process includes accessing (608) a language binding driver library to interface with a driver library of user defined plug-ins, retrieving (610) the user defined plug-ins, and converting (612) the contents of a computation file containing the Java task into a program string with the plug-ins inserted.

Next, the process includes launching (614) the program string to be calculated with a graphics processing unit (GPU), translating (616) instructions of the program string into a lower level language compatible with the GPU, and performing (618) a calculation process with the GPU. The output from the calculation process is translated (620) back into Java, and the Java written output is sent (622) to a downstream dataflow station.

Figure 7:
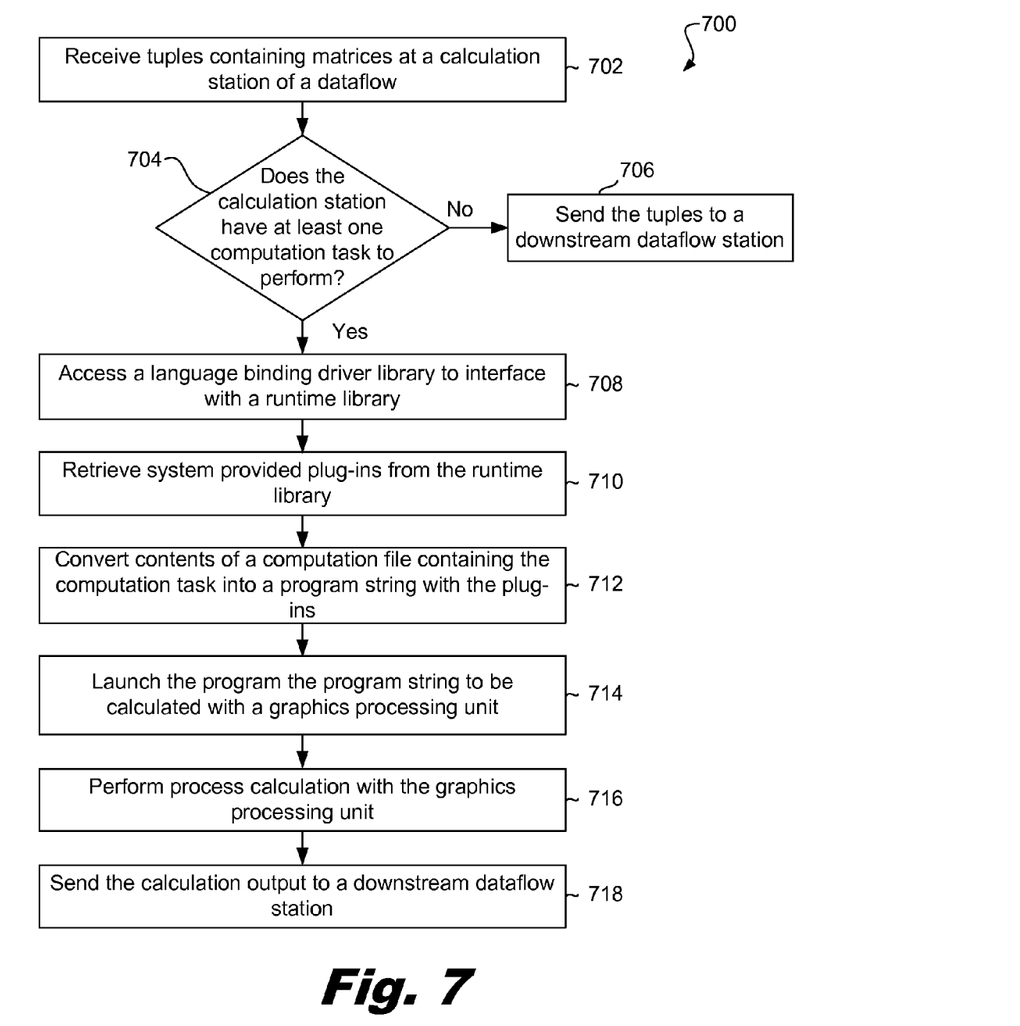
FIG. 7 is a diagram of an example of a flowchart of a process for processing streaming data according to principles described herein.

FIG. 7 is a diagram of an example of a flowchart (700) of a process for processing streaming data according to principles described herein. In this example, the process includes receiving (702) tuples containing matrix elements at a calculation station of a dataflow and determining (704) whether the calculation station has at least one computation task to perform. If not, the tuples are sent (706) to a downstream dataflow station.

However, if there is a computation task to perform, the process includes accessing (708) a language binding runtime library to interface with a runtime library of system provided programs, retrieving (710) the system provided programs, and converting (712) the contents of a computation file containing the computation task into a program string with the system provided programs inserted.

Next, the process includes launching (714) the program string to be calculated with a graphics processing unit (GPU) and performing (716) a calculation process with the GPU. In response to receiving the calculations output, the calculation output is sent (718) to a downstream dataflow station.

While the examples above have been described with reference to specific ways of formatting the input data, any input data format that is compatible with the principles described herein may be used. Also, while the examples above have been described with reference to specific programming languages, any programming language compatible with the principles described herein may be used. For example, programming languages C# and C++ may be used. Further, while the examples above have been described with reference to specific types of system libraries, any library type that is compatible with the principles described herein may be used.

While the examples above make reference to specific dataflow station tasks, any tasks compatible with the principles described herein may be performed at the dataflow stations. Further, while the examples above have made reference to specific types of calculations to be performed with the dataflow stations, any type of calculation may be performed that is compatible with the principles described herein.

While the examples above refer to the dataflow stations that separately contain driver libraries and runtime libraries, these libraries may be incorporated into the same dataflow stations. Such a dataflow station discerns which type of input data it is receiving and which type of plug-ins are most appropriate to create a program string for processing the data. In response to such a determination, the appropriate plug-ins from either the runtime library or the driver library are inserted into the program instructions of the computation file to create the program string. In some examples, the system library, the runtime library, the driver library, and/or the language binding library are programmed in a Compute Unified Device Architecture (CUDA), which is a computing architecture available from Nvidia Corporation headquartered in Santa Clara, Calif., USA. One such example of a CUDA runtime library that is compatible with the principles described herein includes Basics Linear Algebra Subprograms (BLAS) also provided by the Nvidia Corporation.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A method for processing streaming data with open executors, comprising:
receiving input data from an array of sensors at a computation dataflow station, said computation dataflow station comprising a computation file and an open executor that accepts code plug-ins;
converting contents of said computation file into a program string with said code plug-ins from a system library;
launching said program string together with said input data to calculate an output with a graphics processing unit; and
sending said output to a downstream dataflow station.

2. The method of claim 1, wherein said system library is a driver library and said plug-ins are user defined programs.

3. The method of claim 2, wherein launching said program string together with said input data to calculate an output with a graphics processing unit includes using a compiler to translate said user defined programs into a language compatible for execution with said graphics processing unit.

4. The method of claim 1, wherein said system library is a runtime library and said plug-ins are system provided programs.

5. The method of claim 1, further comprising accessing a programming language binding library to interface between a first programming language of said computation file and a second programming language of said plug-ins in said system library.

6. The method of claim 5, further comprising writing said output into said first programming language in response to said graphics processing unit calculating said output.

7. The method of claim 1, further comprising sending said output to a downstream dataflow station.

8. The method of claim 1, wherein receiving input at said computation dataflow station includes receiving tuples containing position vectors.

9. The method of claim 1, wherein receiving input data at said computation dataflow station includes receiving tuples containing matrices.

10. A system for processing streaming data with open executors, comprising:
an input for receiving input data from an array of sensors at a computation dataflow station;
a processor in communication with memory containing program instructions that, when executed, cause said processor to:
receive input data from an array of sensors at a computation dataflow station, said computation dataflow station comprising a computation file and an open executor that accepts code plug-ins;
convert contents of said computation file into a program string with said code plug-ins from a system library;
launch said program string together with said input data to calculate an output with a graphics processing unit; and
send said output to a downstream dataflow station.

11. The system of claim 10, wherein said system library is runtime library and said code plug-ins are system provided programs.

12. The system of claim 10, wherein said system library is driver library and said code plug-ins are user defined programs.

13. The system of claim 10, wherein said program instructions, when executed, further cause said processor to access a programming language binding library to interface between a first programming language of said computation file and a second programming language of said code plug-ins in said system library.

14. The system of claim 10, wherein said input data comprises tuples describing position vectors or matrices.

15. A computer program product for processing streaming data with open executors, comprising:
a non-transitory computer readable storage medium, said tangible computer readable storage medium comprising computer readable program code embodied therewith, said computer readable program code comprising program instructions that, when executed, causes said processor to:
receive input data from an array of sensors at a computation dataflow station, said computation dataflow station comprising a computation file and an open executor that accepts code plug-ins;
convert contents of said computation file into a program string with said code plug-ins from a system library;
launch said program string together with said input data to calculate an output with a graphics processing unit; and
access a programming language binding library to interface between a first programming language of said computation file and a second programming language of said code plug-ins in said system library.

* * * * *